Figure 1:
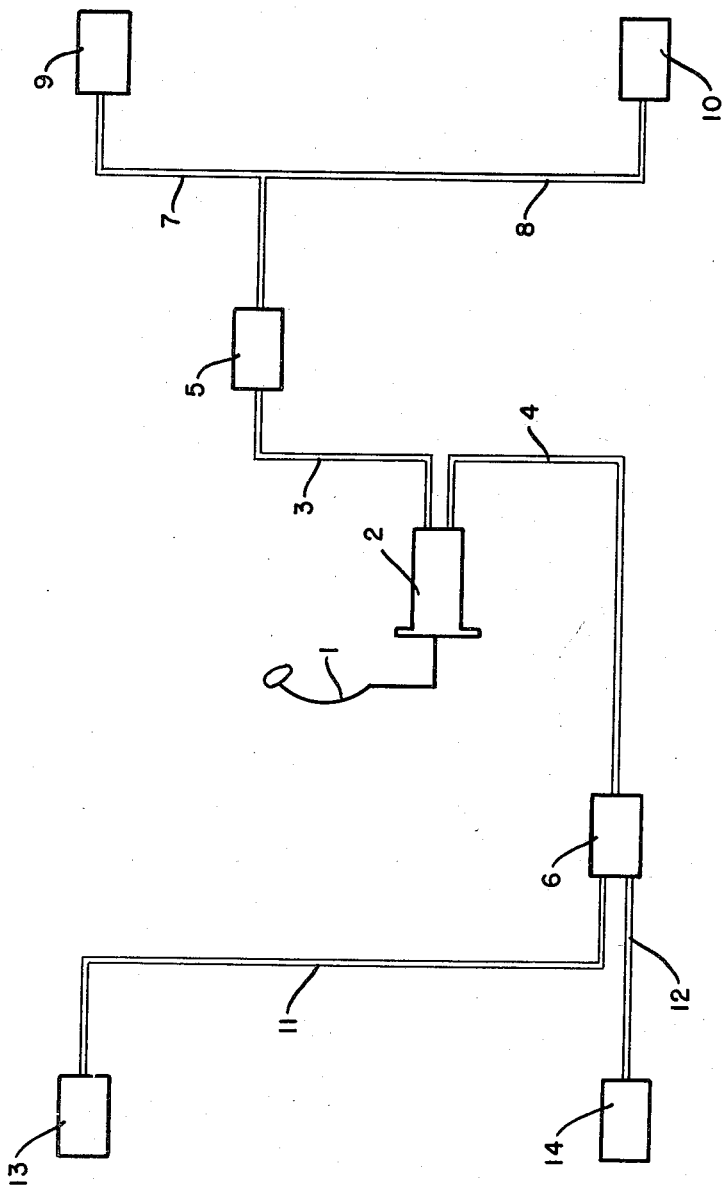

Feb. 25, 1958  R. G. WINTER, JR  2,824,627
SAFETY CUT OFF VALVE FOR HYDRAULIC BRAKE SYSTEM
Filed Jan. 30, 1956  2 Sheets-Sheet 1

INVENTOR.
RAYMOND G. WINTER, JR.
BY
HIS ATTORNEY

Feb. 25, 1958  R. G. WINTER, JR  2,824,627
SAFETY CUT OFF VALVE FOR HYDRAULIC BRAKE SYSTEM
Filed Jan. 30, 1956  2 Sheets-Sheet 2

INVENTOR.
RAYMOND G. WINTER, JR.
BY
*William J. Ruano*
HIS ATTORNEY

United States Patent Office 2,824,627
Patented Feb. 25, 1958

2,824,627

SAFETY CUT OFF VALVE FOR HYDRAULIC BRAKE SYSTEM

Raymond G. Winter, Jr., Pittsburgh, Pa.

Application January 30, 1956, Serial No. 562,145

1 Claim. (Cl. 188—151)

This invention relates to a safety cut off valve for a hydraulic brake system for insuring the availability of hydraulic brakes irrespective of leakage in any one or more of the conduits leading to the respective brake cylinders.

Safety cut off cylinders for permitting the application of hydraulic brakes irrespective of leakage in one of the brake cylinder systems are well known in the art. However, they have outstanding serious disadvantages which account for the fact that they are not in widespread use, at present, even though there is a crying demand for a truly reliable device of this character to provide greater safety on the highways. Prior safety cut off valves for this purpose have the serious drawback of permitting a small amount of bleeding of the hydraulic fluid from the master cylinder to the respective brake conduits, particularly the faulty one which has a leakage. This bleeding effect is either inherent in the valve construction, by providing a bypass through the closed valve, or results as a consequence of each application of the brake pedal which forces a small amount of liquid through the valve or bypass, though the valve otherwise remains closed. Obviously even in the case of a small leakage, the master cylinder will eventually become depleted from such leakage or after a predetermined number of applications of the brake, with the result that the brake system will become inoperative and create an extremely hazardous situation long before the operator has been able to reach a service station to correct the fault.

An object of my invention is to provide a novel safety cut off valve which is devoid of the above named disadvantages and which will absolutely prevent any bleeding or leakage whatsoever from the master cylinder to the faulty or leaky brake conduit or cylinder, irrespective of whether a small or large leak is involved and irrespective of the number of times the brake pedal is depressed.

A more specific object of my invention is to provide, in a hydraulic brake system for vehicles, a novel safety valve construction which completely shuts off the master cylinder from the faulty brake line after either a slight or substantial leakage occurs, but which will still permit a remaining portion of the brake system to operate with full assurance that none of the hydraulic fluid will leak out from the master cylinder or the remaining effective part of the system thereby assuring brakes at all times and irrespective of the amount of leak or the number of times the brake pedal is applied.

Still another object of the invention is to provide a hydraulic brake system which will avoid uneven application of brakes on the respective sides of the car which would otherwise swerve the car to one side as a consequence of braking.

Figure 2:
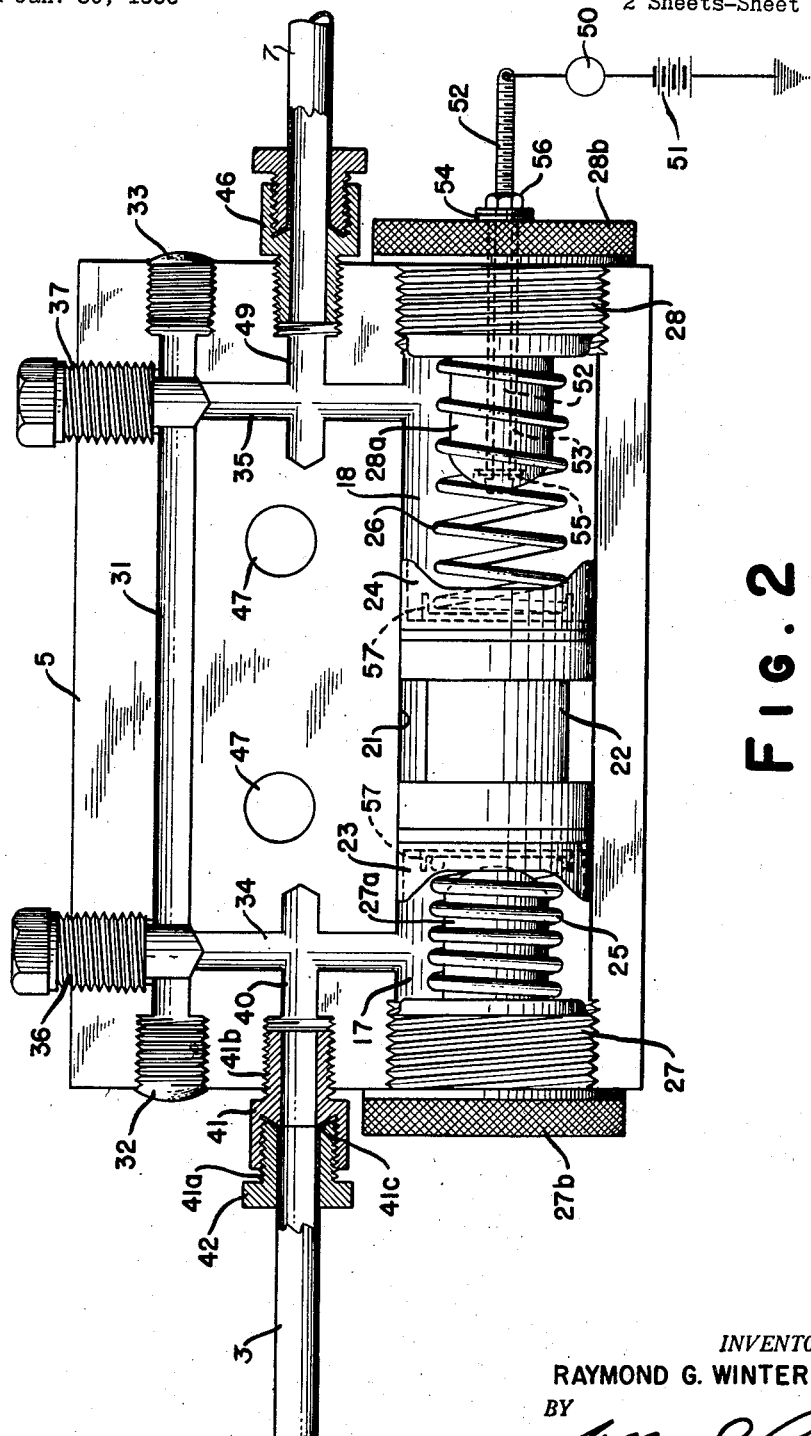

Other objects and advantages of the present invention will become apparent from a study of the following description taken with the accompanying drawings wherein:

Figure 1 is a schematic diagram of a hydraulic brake system for vehicles, such as automobiles, trucks and trailers, and embodying a pair of safety cut off valves constructed in accordance with the present invention; and Figure 2 is an enlarged longitudinal cross-sectional view of one of the hydraulic safety cut off valves shown in Figure 1.

Referring more particularly to Figure 1 of the drawings, numeral 1 denotes a brake pedal, depression of which causes a piston in the master cylinder 2 to apply pressure to hydraulic liquid therein, which pressure is transmitted through conduits or pipes 3 and 4 to safety cut off valves 5 and 6, respectively, constructed in accordance with the present invention, thence to pipes or conduits 7 and 8 which lead to the rear brake cylinders 9 and 10, and through pipes or conduits 11 and 12 which lead to the front brake cylinders 13 and 14, respectively.

So long as there is no leakage in the system, such as in any of the brake conduits or pipes all four brakes will receive hydraulic liquid or fluid under pressure. However, it will be apparent that if a leakage occurs, say in either or both pipes 7 or 8 leading to the rear brake cylinders, the safety cut off valve 5 will operate in a manner so as to prevent further liquid from flowing from the cylinder 2, through the safety cut off valve 5 to the faulty or leaky portion. But since hydraulic fluid under pressure from the master cylinder can still flow through safety cut off valve 6 which remains open and thence to the front brake cylinders, it will be apparent that balanced braking pressure will be provided on the respective sides of the vehicle—that is on the front brakes only.

The invention resides particularly in the construction of the respective safety cut off valves 5 and 6. Since such valves are of identical construction, the description of valve 5 is deemed to suffice. Valve 5 may be in the form of a solid rectangular block of steel or other suitable metal having a cylindrical bore 21 formed therein and in which bore there is slidingly fitted, with very close tolerance, a piston 22, preferably one having an intermediate portion of reduced diameter to minimize friction by reducing the area of the sliding surface. On opposite sides of piston 1 there are provided sealing cups 23 and 24 of rubber or other suitable elastic material for preventing leakage of hydraulic fluid along the outer walls of the piston. Sealing cups 23 and 24 are normally held against the opposite ends of cylinder 22 by helical springs 25 and 26, respectively, which springs have one end seated in well portions formed in sealing cups 23 and 24, respectively, the opposite ends of which springs abut against the inner face of sealing, end plugs 27 and 28 respectively. The springs also tightly encircle the inward extending cylindrical projections 27a and 28a integrally formed on the respective plugs. End plugs 27 and 28 are screw threaded to corresponding threads formed in the bore 21 at the ends of the bore and the plugs may be easily turned by hand by grasping the knurled portions 27b and 28b. Of course, portions 27b and 28b may be in the form of hexagonal nuts or the like if so desired. It should be noted that projections 27a and 28a serve as limit stop elements for limiting the extent of sliding movement of piston 22.

Another cylindrical bore 31 is provided through the entire length of valve 5 and the ends of such bore may be plugged by screw threaded plugs 32 and 33 which may have suitable kerfs in the outer end surfaces to enable screwing and unscrewing with a screw driver. Laterally extending bores 34, 35 are also formed in valve 5 to provide communication between the chambers 17 and 18 formed in the opposite sides of piston 22. The outer ends of bores or ports 34 and 35 are threaded and are plugged by means of screw threaded plugs 36 and 37 which have conically tapered inner ends, acting, in effect, as needle valves for closing communication between ports 34 and 35, by way of port 31 as a consequence of screwing in of the plugs 36 and 37. Plugs 36 and 37 are normally in the closed position as shown so as to prevent intercommunication between the chambers 17 and 18 formed on the opposite sides of piston 22.

An inlet port 40 is formed in the block so as to communicate with port 34. A fitting 41 is screw threaded into a threaded portion at the outer end of the port to provide a suitable connection with the master cylinder. Fitting 41 is provided with internal threads 41a and external threads 41b which are screw threaded, respectively, to the external threads of a cooperating fitting 42 secured to pipe 3 leading to the master cylinder and with the internal threads formed in valve 5. A pipe or conduit 3 extends through the fitting 42 and has an outwardly tapered end which fits against the tapered portion 41c of fitting 41 so that upon screwing in of fitting 42 the flared end portion of pipe 3 will become sealed between the respective fittings. Of course, any other suitable readily detachable connection may be made for introducing hydraulic liquid from the master cylinder to port 34. A similar connection 46 as described above may be made on the opposite or outlet side of the valve to provide a detachable connection between the outlet port 35 and pipes 7 and 8 which lead to the rear brake cylinders. Holes 47 may be provided through the block forming the valve 5 to allow insertion therethrough of mounting bolts or the like for suitably mounting valve 5 in any desired position.

A visual warning system is incorporated in the valve 5 for illuminating a pilot light 50 which is connected to the battery 51 of the vehicle which, in turn, is connected to a screw threaded stud 52 which projects through the center of the end plug 28 and its projection 28a and is insulated from the plug by virtue of an insulating cylindrical tube 53 which closely surrounds the stud 52. Insulating washers and sealing elements 54 and 55 are provided at the ends of tube 53. Turning of a nut 56 effects compression of the respective insulating washers 54 and 55. A metal contact plate or washer 57 is provided in the sealing cup 24 and against which spring 26 is seated.

Normally piston 22 will be out of contact with the inner end and contact forming portion of stud 52 therefore the pilot light 50 will not be energized for lack of a connection to ground. However, when piston 22 is forced to the right sufficiently so that metal washer 56 engages the contact element at the inner end of stud 52, thus forming a connection to ground through the spring 26 and plug or valve 5 which is grounded, current will flow and illuminate pilot light 50 to warn the operator of the vehicle that a leakage exists in the hydraulic system.

The operation of the safety cut off valve is as follows. When it is desired to initially introduce hydraulic fluid into the respective front and rear brake cylinders, plugs 36 and 37 are unscrewed to open the needle valves so as to permit fluid flow from the master cylinder through conduits 34, 31 and 35 to the outlet port 49, thence to pipe 3 and to the rear brake cylinders. After the system has been filled with hydraulic liquid and rid of air pockets plugs 36 and 37 are screwed to the closed position as shown so as to prevent any further communication between ports 34 and 35—that is, so as to prevent any further bypassing between the chambers 17 and 18 on opposite sides of piston 22. Thus, during normal operation of the brakes, pressure in the fluid master cylinder caused by depression of the foot pedal will introduce hydraulic liquid under pressure either to the left chamber 17 to the rear brakes, or to a corresponding left chamber in valve 6. It will be particularly noted that there is no liquid flow whatsoever possible between the chambers 17 and 18 at the left and right of the piston 22 in either valve 5 or 6. Assume now that a leak has developed in either pipe 7 or 8 connected to the respective rear brake cylinders. Hydraulic liquid from chamber 18 will be depleted or reduced as a consequence of such leakage and thereby pressure in chamber 18 will be reduced to less than the pressure in chamber 17 thereby causing unbalance of pressures at the ends of piston 22 so that piston 22 will move to the right as viewed in Figure 2. After loss of a predetermined amount of fluid from the right hand chamber 18, piston 22 will finally engage projection or stop element 28, which will prevent further movement to the right of the piston and at the same time the pilot or safety light 50 will become illuminated as described hereinabove. Because of such limit of movement of piston 22, further loss of hydraulic liquid from chamber 18 on the right of piston 22 will have no further consequence—more particularly, it will not diminish the supply of hydraulic liquid in the left chamber 17. And because hydraulic fluid cannot leak from chamber 17 connected to the master cylinder, liquid will be maintained therein under pressure, and in communication with the corresponding left cylinder in valve 6 leading to the front brakes. Therefore, irrespective of whether the leakage in the rear brake system is a small one or a large one, the liquid supply in the master cylinder will be maintained as well as the pressure in the left chamber of the respective valves 5 and 6, thus insuring full efficiency and operation, indefinitely, of the front brakes in a balanced manner.

Upon receiving a warning by illumination of lamp 50, the operator of the vehicle will know that there is a leak in the system which should be repaired. However, he can continue to operate the vehicle to complete his trip and operate the brakes almost indefinitely without impairing the efficiency of the remaining operative front brakes. This insures safety and gives adequate time for repair of the fault without danger of loss of brakes, irrespective of the nature of the leakage or frequence of depressing of the brake pedal.

Thus it will be seen that I have provided an efficient, relatively inexpensive and highly reliable safety system for a hydraulic brake for vehicles, such as cars and buses, which system can be used for other similar purposes wherein the problem is substantially the same; furthermore, I have provided a novel safety cut off valve which insures operation of the brakes at all times irrespective of whether a small or large leak develops and irrespective of the number of times the brake pedal is depressed while the leakage continues.

While I have illustrated and described one embodiment of my invention, it will be understood that this is by way of illustration only, and that various changes and modifications may be made within the contemplation of my invention and within the scope of the following claim.

I claim:

A safety cut off valve for a pressure line of a hydraulic brake system, comprising a valve body containing a cylindrical bore, a piston slidably mounted in said bore and separating it into a liquid inlet chamber and a liquid outlet chamber, one of said chambers being connectable to a master cylinder and the other being connectable to brake cylinders, whereby in the event of leakage in the system outlet chamber, there will be no resultant leakage from the inlet chamber, flexible, liquid-sealing cups of electrical insulating material covering the working surfaces of said piston, each containing a spring-retainer metal washer, a bypass port extending through said bore exteriorly of said piston to provide intercommunication between said chambers, a valve for completely closing said bypass port to completely prevent liquid flow between said chambers, plugs screwed onto the end portions of said bore and having integral projections serving as stop elements for limiting the extent of sliding movement of said piston, a pair of springs, each having one end seated on the end face of one of said plugs and closely surrounding the corresponding projection to form a grounded connection, and the other end seated in one of said washers, to provide electrical connections through said springs to said washers, an electrical contact insulatingly mounted inside said projection on the screw cap closing the outlet chamber, and a pilot light and source of electrical energy in series with said contact, whereby said pilot light will be illuminated by completion of the circuit from said contact to the corresponding washer, spring and plug to ground.

References Cited in the file of this patent
UNITED STATES PATENTS

| | | |
|---|---|---|
| 2,077,646 | Snyder | Apr. 20, 1937 |
| 2,239,348 | Wirtanen et al. | Apr. 22, 1941 |
| 2,746,252 | Reese | May 22, 1956 |